United States Patent [19]

Schmidle et al.

[11] Patent Number: 5,611,474
[45] Date of Patent: Mar. 18, 1997

[54] ATTACHMENT MEMBER SETTING TOOL

[75] Inventors: Josef Schmidle, Göffis; Dimitrios Stefanoudakis, Vienna, both of Austria

[73] Assignee: Hilti Aktiengesellschaft, Furstentum, Liechtenstein

[21] Appl. No.: 443,797

[22] Filed: May 18, 1995

Related U.S. Application Data

[62] Division of Ser. No. 257,250, Jun. 8, 1994.

[51] Int. Cl.⁶ .................................................. B25C 1/14
[52] U.S. Cl. ........................... 227/10; 227/55; 227/147; 411/441
[58] Field of Search .................................. 227/10, 11, 9, 227/55, 56, 57, 58, 60, 43, 147; 411/441

[56] References Cited

U.S. PATENT DOCUMENTS

| | | | |
|---|---|---|---|
| 2,582,578 | 1/1952 | Becker | 227/55 |
| 3,391,842 | 7/1968 | Mathes | 227/147 |
| 3,449,988 | 6/1969 | Gallo, Sr. | 227/147 |
| 3,652,003 | 3/1972 | Leonardo et al. | 227/10 |
| 4,829,804 | 5/1989 | Strobel | 227/55 |
| 4,901,712 | 2/1990 | Voegell et al. | 227/147 |

*Primary Examiner*—Scott A. Smith
*Attorney, Agent, or Firm*—Anderson Kill & Olick P.C.

[57] ABSTRACT

Attachment members (28) are used for securing insulation panels (30) to structural components (31). Each attachment member (28) includes a nail (29) which is driven by a setting tool into the structural component. A connecting region (26a) on a guide tube (25) of the setting tool generates a frictional force with a counter-connecting region of a hollow shaft (28b) in the attachment member when the nail (29 is driven. Via the generated frictional force, it is possible to check if the attachment member is properly connected after the setting tool drives the nail. The frictional force between the guide tube (25) and the inside surface of the hollow shaft is greater than the frictional force between the hollow shaft (28b) and the insulation panel (30).

4 Claims, 5 Drawing Sheets

ATTACHMENT MEMBER SETTING TOOL

This is a divisional application of Ser. No. 08/257,250, filed Jun. 8, 1994, pending.

BACKGROUND OF THE INVENTION

The present invention is directed to a setting tool for securing an attachment member used for fastening insulation plates to structural components by means of the explosive powder charge operated setting tool. The attachment member has a large area head, a hollow shaft extending axially from the head and penetrating through the insulation panel with an abutment within the hollow shaft for a nail driven by a setting tool into the structural component.

An attachment member for securing insulation panels to structural parts is disclosed in DE-OS 39 31 833 with the attachment member secured to a structural component by a nail. The attachment member has a large area head, a hollow shaft connected to the head as a single element and the nail. A radially upsettable sleeve is located in the hollow shaft and has an end which serves as an abutment for a head of the nail. Initially, in the attachment operation, the hollow shaft of the attachment member is pushed through the insulation panel formed mainly of a material with a low compressive strength. The attachment member head comes to rest against the insulation panel while the opposite end of the hollow shaft abuts against the structural component. The nail is driven through the hollow shaft into the structural component by a setting tool using an explosive powder charge. At the end of the driving step, the head of the nail impacts against the abutment whereby the attachment member and the insulation panel are secured to the structural component.

When nails are being driven flaws or breakdowns can occur, whereby the attachment member is not effectively anchored. Such flaws can occur when the nail is driven into a gap or joint such that the nail is not secured to the structural component. Other flaws can occur if the wrong amount of driving energy is supplied by the setting tool or when the fastening members are driven into an edge region of the structural component.

In actual practice, it has been noted that inexperienced or inadequately trained setting tool operators are unable visually to identify setting flaws. In particular, when setting attachment members in thermal insulation panels formed of a hard-foamed material, it has often been observed that failed attachment members stick in the hard-foamed material due to increased friction between the hollow shaft and the hard-foamed material with the result that they are considered to be correctly set members.

SUMMARY OF THE INVENTION

Therefore, the primary object of the present invention is to provide a setting tool for securing attachment members used for fastening insulation panels to structural components where an inadequate attachment can be recognized.

Still another object of the present invention is to provide a guide tube for the setting tool which, in combination with the attachment member, can effectively carry out the attachment.

In accordance with the present invention, the attachment member can be connected with a region of the setting tool before the nail is driven and such connection is releasable after driving the nail by overcoming a force greater than the frictional force between the hollow shaft and the insulation panel.

The invention method enables the identification of a flawed or inadequate securement of the attachment member because of a failure in the setting operation whereby a tensile force acts on the attachment member when the setting tool is removed after the completion of the setting operation, whereby the tensile force corresponds to the frictional force afforded by the connection between the region of the setting tool and the attachment member. If there is a failure in the setting operation, the attachment member is at least partially pulled out of the insulation panel, so that its large area head is spaced from the outwardly facing surface of the insulation panel.

Preferably, the connection with a region of the setting tool is effected by introducing a guide tube on the setting tool into the hollow shaft of the attachment member. The region of the setting tool has a cross-sectional area with a diameter slightly greater than the inside diameter of the hollow shaft, whereby a frictional force is generated by the coaction of the region on the setting tool with the hollow shaft of the attachment member with the frictional force generated being larger than the frictional force between the outside wall surface of the hollow shaft and the insulation panel fixed by the attachment member to a structural component or part.

To limit the frictional force to a specific region of the attachment member, the guide tube has a connecting region or contact surface. Such a connecting region or contact surface can be located at the free end of the guide tube or, if the guide tube extends deeply into the attachment member, at a region corresponding to a rearward region of the attachment member.

The frictional force developed between the attachment member and the guide tube can be effected preferably by profiling the connecting region. A knurled surface, a circumferential knurled surface, or at least a projection or recess can provide the requisite profiling.

Since insulation panels are commercially available in different thicknesses, attachment members of different axial lengths are also offered. If the spacing between the engagement surface of the attachment member for the free end of the guide tube extending transversely of the axis of the attachment member and the connecting region are different, preferably the connecting region is disposed on a separate part axially displaceable relative to the guide tube. As a result, the connecting region is axially displaceable with respect to the guide tube. Axial displacement can be effected by an outside thread on the guide tube and a corresponding inside thread on the separate part. A safety pin or a set screw can serve for fixing the two parts together.

Preferably, the attachment member has a counter-connecting region in the inside surface of the hollow shaft. Accordingly, corresponding surfaces generating frictional forces are arranged on the attachment member and cooperate with the connecting region of the setting tool or with an outside surface on the guide tube.

It is expedient if the counter-connecting region on the inside surface of the hollow shaft is profiled. Such profiling can be formed by knurling, circumferential knurling, or at least one projection or one recess or preferably by axially extending ribs extending along the inside surface of the hollow shaft. The size and, as a result, the frictional force of the counter-connecting region cooperating with the outside surface of guide tube can be changed by the disposition of the longitudinal or axially extending ribs. By increasing the width of the rib the frictional force can be increased.

Preferably, several longitudinal ribs are arranged around the circumference of the inside surface of the hollow shaft. Radial guidance of the guide tube on the setting tool inside the hollow shaft of the attachment member is achieved by the uniform distribution of the axially extending ribs.

Preferably, the inside surface of the hollow shaft bounded by the inner surfaces of the ribs is designed to be cylindrical. An attachment member designed in such a way can be brought into connection with a guide tube of the setting tool whose connecting region has a cylindrical outside surface. The outside diameter of the guide tube is slightly larger in comparison with the diameter of the inside opening of the hollow shaft bounded by the axially extending rib, so that the connection between the guide tube and the attachment member after the nail in the attachment member is driven, can be detached or separated only by overcoming a force exceeding the frictional force between the hollow shaft and an insulation panel.

Profiled surfaces in the connecting region of the guide tube or even the counter-connecting region of the hollow shaft afford a positive assist in generating the frictional force, so that the connecting regions can be made very short with respect to their axial extent. This feature has a positive effect on the design consideration of the attachment member and the guide tube, as well as upon the duration of the force application required for placing the attachment member on the guide tube or when removing the guide tube from the attachment member.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
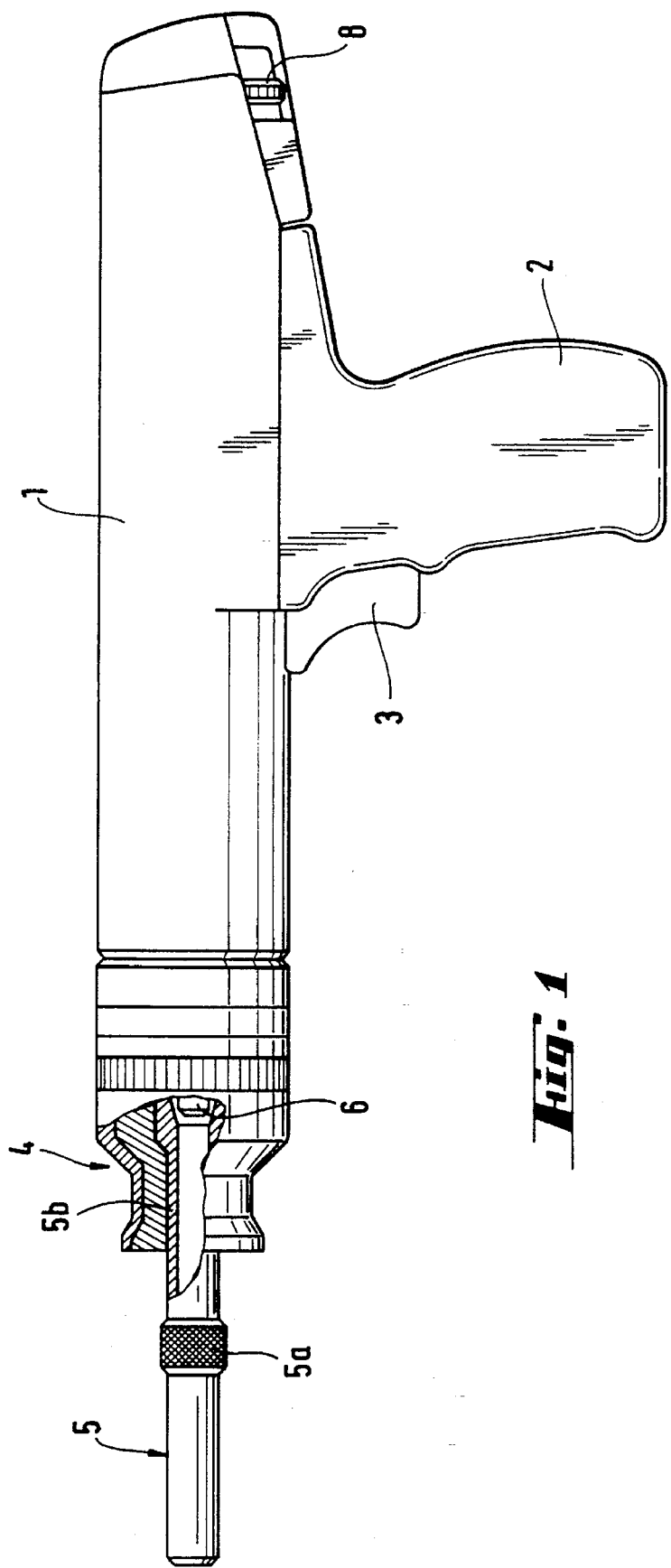
FIG. 1 is a side view, partly in section, of an explosive powder charge operated setting tool with a guide tube embodying the present invention.

In FIG. 1 an explosive powder charge operated setting tool is illustrated comprising a housing 1 with a handle 2 extending downwardly from the housing and containing an actuating switch 3. A receiving region 4 for a guide tube 5 is located at the forward end of the housing and the leading end of an axially displaceable piston 6 can be noted in the front end of the housing. An adjustment device 8 is located at the rear end of the housing for optimizing the output energy of the tool.

Figure 2:
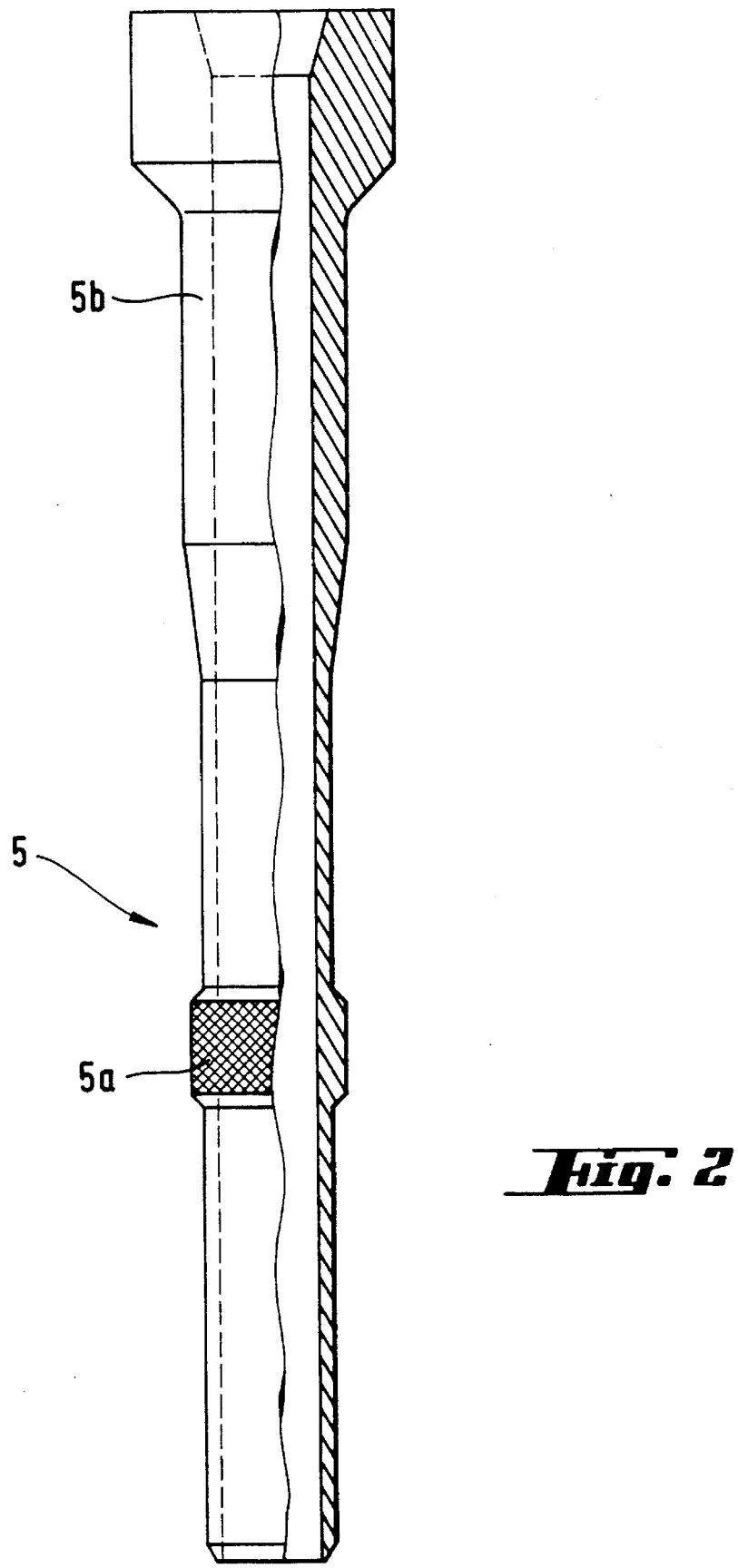
FIG. 2 is an enlarged sectional view of the guide tube illustrated in FIG. 1.

At least one cartridge, not shown, can be placed in the setting tool and can be ignited by the actuating switch 3 with the assistance of a known mechanical device. The explosive pressure generated by the cartridge acts on a trailing end of the piston, that is, an end facing toward the handle 2, and displaces the piston in the setting direction, that is, to the left as viewed in FIG. 1. Guide tube 5 shown enlarged in FIG. 2, has a axially extending contact surface or connecting region 5a and an insertion end 5b for cooperating with the receiving region in the setting tool. The connecting region 5a extends axially for at least a part of the axial length of the guide tube 5 and extends radially outwardly from the outside surface of the tube. The surface of the connecting region 5a is profiled with a circumferentially extending knurling.

Figure 3:
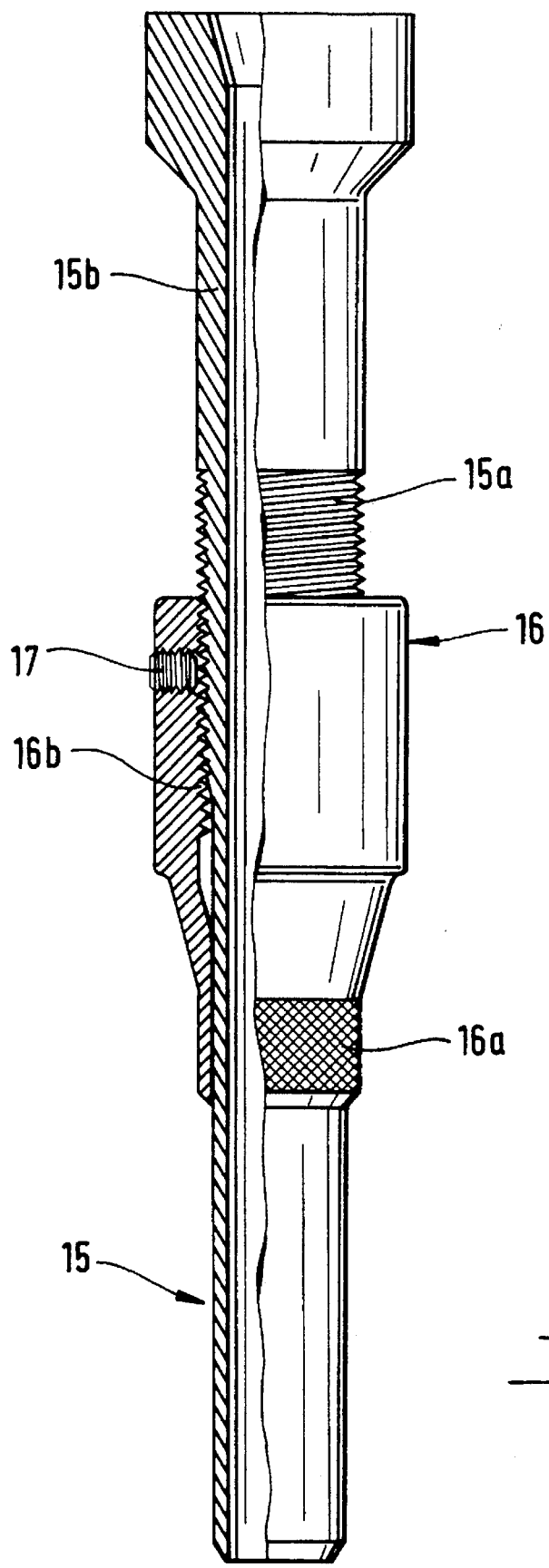
FIG. 3 is another guide tube, shown partly in section, which can be placed on the setting tool displayed in FIG. 1.

In FIG. 3 another guide tube 15 is shown including a separate part 16 arranged to be axially displaceable on the guide tube by a threaded connection 15a, 16b. A set screw 17 extending through the separate part 16 into contact with the guide tube 15 is an anti-rotation device. A connecting region 16a projecting radially outwardly from the outside surface of the guide tube 15 is formed as a unitary part of the separate part 16 and has a profiled surface formed by a circumferential knurling. An insertion end 15b of the guide tube 15 can be engaged with a receiving region of a setting tool.

Figure 4:
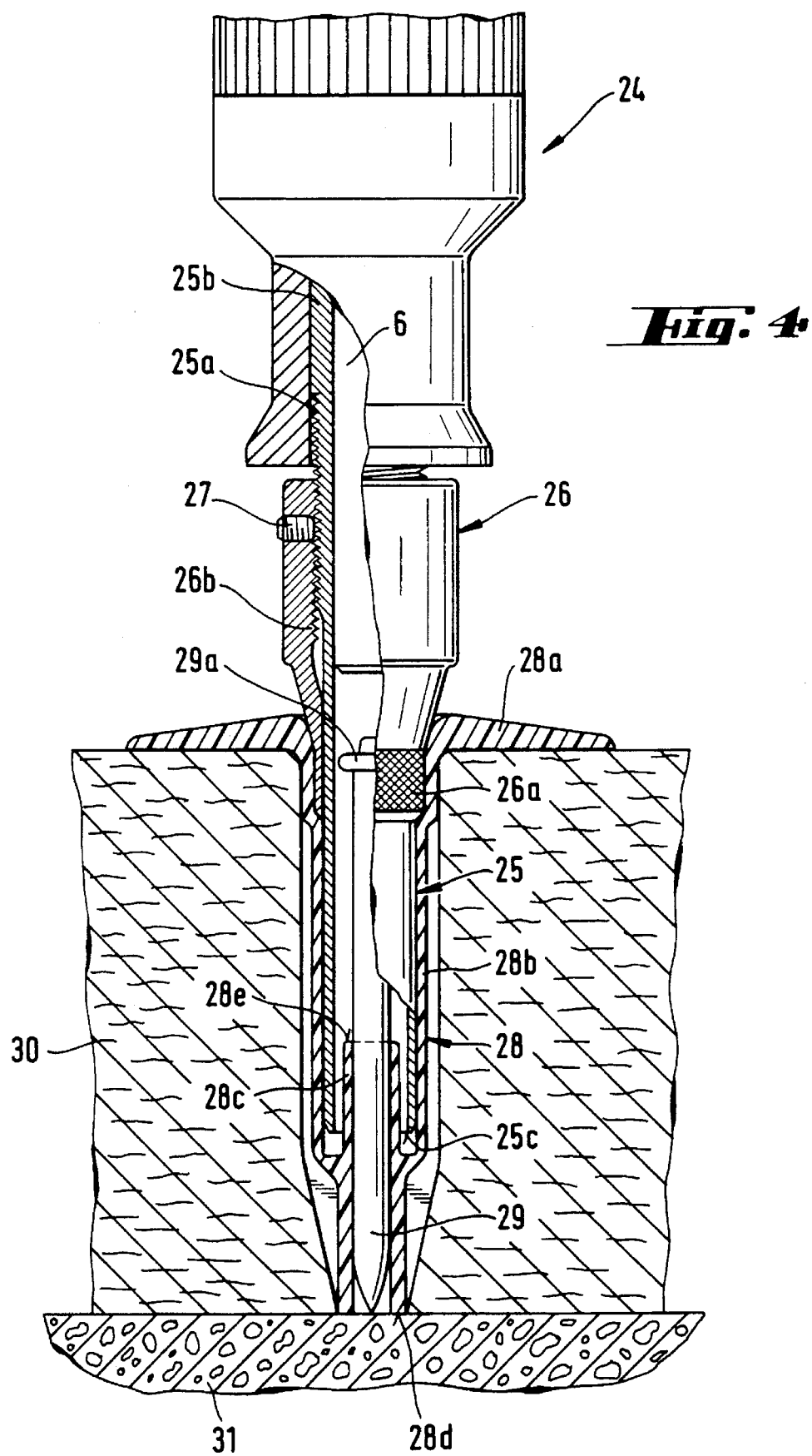
FIG. 4 is still another guide tube, shown partly in section, along with an attachment member extending through an insulation panel and arranged to be connected to a structural component.

Another guide tube 25 is illustrated in FIG. 4 and has an insertion end 25b fitted into the receiving region 24 of a setting tool, not shown in detail. A separate part 26 with an inside thread 26b is disposed on the guide tube 25 and the inside thread 26b engages an outside thread 25a on the guide tube 25. Accordingly, the separate part 26 is detachably connected with the guide tube. The separate part 26 can be fixed non-rotatably with respect to the thread 25a in guide tube 25 by a set screw 27 in threaded engagement with the separate part 26. A connecting region 26a is formed as a unitary part of the separate part 26 and projects radially outwardly beyond the outside diameter of the guide tube 25.

Guide tube 25 extends axially into the interior of a hollow shaft 28b of the attachment member 28 with the connecting region 26a in frictional connection with a widened section of the inside surface of the hollow shaft 28b adjacent head 28a on the attachment member 28. Attachment member 28 has the large area head 28a, a nail 29 located within the hollow shaft 28b, and a radially upsettable axially extending sleeve 28c with an upwardly facing end 28e which serves as an abutment for the head 29a of the nail 29 after it is driven into the structural component 31. The leading or free end 25c of the guide tube 25 projects into the inside of the hollow shaft 28b at least partially overlapping the upsettable sleeve 28c. In the position shown in FIG. 4, before carrying out the setting operation, the hollow shaft 28b of the attachment member 28 extends through an insulation panel 30 and abuts at its leading end 28d against the surface of structural component 31. The large area head 28a of the attachment member 28 rests on the outside surface of the insulation panel 30, that is, the surface facing away from the structural component 31.

Figure 5:
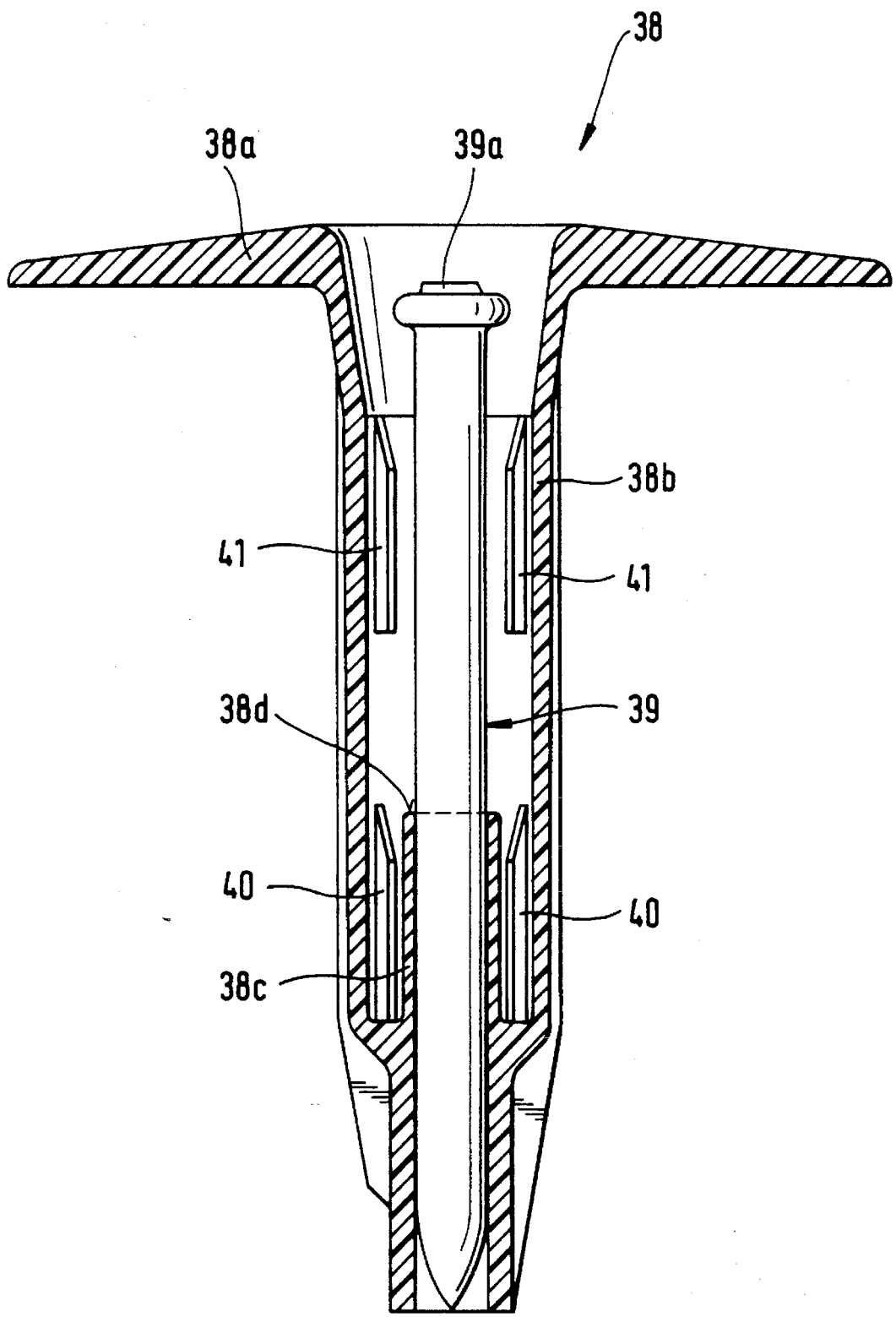
FIG. 5 is another attachment member embodying the present invention, shown enlarged and in section.

In FIG. 5 an attachment member 38 is illustrated with a large area head 38a extending transversely of an axially extending hollow shaft 38b. One end of the shaft is connected to the head 38a and the other end is arranged to bear against the surface of a structural component, such as shown in FIG. 4. A nail 39 extends axially within the hollow shaft 38b and a portion of the nail extends through a radially upsettable sleeve 38c with the upper or trailing end of the sleeve forming an abutment 38d for a head 39a of the nail when it is driven into a structural component. Axially extending ribs 40, 41 are formed on and extend inwardly from the inside surface of the hollow shaft 38 with the ribs spaced angularly apart around the inside circumference of the hollow shaft. One set of ribs 40 is located in the region of the sleeve 38c and the other set of ribs 41 is located closer to the head 38a.

Ribs 40, 41 extend essentially radially inwardly from the inside surface of the hollow shaft 38b with one set of ribs 40 spaced from the other set 41 in the axial direction of the hollow shaft 38c. In FIG. 5 only two ribs 40 and 41 of a total of three ribs in each set are visible. The axially extending ribs are spaced approximately 120° apart from one another. As viewed in FIG. 5 the upwardly facing ends of the ribs, that is, the ends closer to the head 38a, have a decreasing height, that is, they slope outwardly toward the inside surface of the hollow shaft. The inside opening in the hollow shaft 38b bounded by the radially inner surfaces of the longitudinal ribs 40, 41 is cylindrically shaped and serves for affording radial guidance for the guide tube of a setting tool.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

We claim:

1. An explosive powder charge operated setting tool in combination with for driving an axially extending fastening element and an axially extending attachment member receiving said fastening element, the setting tool comprising a housing (1) having a front end and a rear end spaced apart in a driving direction of the setting tool, an axially displaceable piston (6) mounted in said housing and displaceable from the front end thereof, a receiving region (24) in the front end of said housing, and an axially extending guide tube (15, 25) having a first end secured in the receiving region in the front end of said setting tool and a second end spaced axially from the first end outwardly from the front end of said setting tool and located within the attachment member, said guide tube having an axially extending outer surface and inner surface, means forming an axially extending contact surface located on and encircling said outer surface of said guide tube between and spaced axially from the first and second ends thereof and being in frictional contact with the attachment member, and said means forming said contact surface extending axially for a part of the axial length of said guide tube (15, 25) and extending radially outwardly from the outside surface of said guide tube.

2. Setting tool, as set forth in claim 1, wherein said means forming said contact surface (5a, 16a, 26a) is a profiled surface.

3. Setting tool, as set forth in claim 1 or 2, wherein said means forming said contact surface (16a, 26a) being located on a separate part (16, 26) axially adjustable relative to the guide tube (15, 25).

4. Setting tool, as set forth in claim 2, wherein said means forming said contact surface being a unitary part of said guide tube.

* * * * *